US007719525B2

(12) United States Patent
Fukuo

(10) Patent No.: US 7,719,525 B2
(45) Date of Patent: *May 18, 2010

(54) ELECTRONIC DEVICE

(75) Inventor: Motoo Fukuo, Shiga (JP)

(73) Assignee: NEC Electronics Corporation, Kawasaki (JP)

( * ) Notice: Subject to any disclaimer, the term of this patent is extended or adjusted under 35 U.S.C. 154(b) by 754 days.

This patent is subject to a terminal disclaimer.

(21) Appl. No.: 11/092,941

(22) Filed: Mar. 30, 2005

(65) Prior Publication Data

US 2005/0219235 A1 Oct. 6, 2005

(30) Foreign Application Priority Data

Mar. 31, 2004 (JP) ............................ 2004-103546

(51) Int. Cl.
*G06F 3/038* (2006.01)
*G09G 3/36* (2006.01)

(52) U.S. Cl. ......................... 345/204; 345/98; 345/100

(58) Field of Classification Search ........... 345/87–104, 345/204
See application file for complete search history.

(56) References Cited

U.S. PATENT DOCUMENTS

| | | | | |
|---|---|---|---|---|
| 6,335,718 | B1 | 1/2002 | Hong et al. | |
| 6,356,260 | B1 | 3/2002 | Montalbo | |
| 6,480,180 | B1 | 11/2002 | Moon | |
| 6,862,015 | B2 | 3/2005 | Fujioka et al. | |
| 6,954,200 | B2 | 10/2005 | Kim | |
| 7,075,505 | B2 | 7/2006 | Sakaguchi et al. | |
| 7,102,609 | B2 | 9/2006 | Saitou et al. | |
| 7,193,597 | B2 | 3/2007 | Sunohara | |
| 2001/0054997 | A1* | 12/2001 | Fujioka et al. | 345/87 |
| 2002/0180684 | A1* | 12/2002 | Saitou et al. | 345/98 |

(Continued)

FOREIGN PATENT DOCUMENTS

CN 1482507 A 3/2004

(Continued)

OTHER PUBLICATIONS

Chinese Office Action dated Jun. 13, 2008 with English-language translation.

(Continued)

*Primary Examiner*—Jimmy H Nguyen
(74) *Attorney, Agent, or Firm*—McGinn IP Law Group, PLLC

(57) ABSTRACT

To reduce EMI and current consumption in internal wiring after display data have been input to a data driver. Display data DN/DP constituted by RSDS signals input to a data driver in a first stage are converted to display data DA constituted by CMOS signals, subjected to primary inversion control according to a data inversion signal INV generated inside, and transferred into internal wiring 31 in a data capturing circuit 30. Then, the display data are subjected to secondary inversion control by a secondary data inversion circuit 33 disposed immediately before data registers 34 according to the data inversion signal INV, and then captured by the data registers 34. Further, chip-to-chip transfer of the display data DA and the data inversion signal INV to the data drivers in second and subsequent stages is performed through the internal wiring 31 and internal wiring 32. Then, as in the data driver in the first stage, the display data DA are captured by the data registers 34.

14 Claims, 12 Drawing Sheets

U.S. PATENT DOCUMENTS

| | | | |
|---|---|---|---|
| 2004/0017344 A1 | 1/2004 | Takemoto | |
| 2005/0083289 A1* | 4/2005 | Yang | 345/100 |
| 2005/0219189 A1 | 10/2005 | Fukuo | |
| 2005/0219235 A1 | 10/2005 | Fukuo | |

FOREIGN PATENT DOCUMENTS

| | | |
|---|---|---|
| JP | 11-194748 A | 7/1999 |
| JP | 11-346337 A | 12/1999 |
| JP | 2000-207077 | 7/2000 |
| JP | 2001-174843 | 6/2001 |
| JP | 2001-331150 | 11/2001 |
| JP | 2001-356737 | 12/2001 |
| JP | 2002-32063 | 1/2002 |
| JP | 2002-62840 | 2/2002 |
| JP | 3285332 | 3/2002 |
| JP | 2002-323877 | 11/2002 |
| JP | 2003-60061 | 2/2003 |
| JP | 2003-84726 | 3/2003 |
| JP | 2005-284217 | 10/2005 |

OTHER PUBLICATIONS

United States Office Action dated Oct. 7, 2008 from U.S. Appl. No. 11/085,200.

Chinese Office Action dated Oct. 30, 2009 with a Japanese translation and a partial English translation thereof.

Japanese Office Action dated Feb. 23, 2010 with a partial English translation thereof.

* cited by examiner

IFM= "H"

ELECTRONIC DEVICE

FIELD OF THE INVENTION

The present invention relates to an electronic device, particularly, to an electronic device in which data from a first semiconductor integrated circuit device are transferred to a plurality of second semiconductor integrated circuit devices.

BACKGROUND OF THE INVENTION

As dot matrix type display devices, liquid crystal display devices are used in various devices such as a personal computer due to their advantages of thinness, light weight, and low power. Color liquid crystal display devices with an active matrix system in particular, which are advantageous for controlling image quality with high definition, have become dominant.

The liquid crystal display module of the liquid crystal display device includes a liquid crystal panel (LCD panel), a control circuit (which will be hereinafter referred to as a controller) constituted from a semiconductor integrated circuit (which will be hereinafter referred to as an IC), scanning side driving circuits (which will be referred to as scanning drivers) and data side driving circuits (which will be referred to as data drivers), both constituted from ICs. Due to the higher definition of the picture quality of the liquid crystal panel and the larger size of the liquid crystal panel, the transfer speed of display data has become faster. When the transfer speed of the display data becomes faster, the frequencies of inversion of a clock signal and the display data in a unit of time will increase. When the clock signal and the display data are binary voltage signals (which will be referred to as CMOS signals) the amplitude of which changes (inverts) according to whether the signals are at a supply voltage level ("H" level) or a ground level ("L" level), there is a problem in which EMI (Electro Magnetic Interference) noise and current consumption increase in wiring between the controller and the data drivers through which the clock signal and the display data are transferred.

As one method of solving this problem, a method is used in which primary inversion of the logic of display data constituted by a CMOS signal is performed by a primary data inversion circuit of a transfer source according to a data inversion signal INV, thereby reducing the frequency of inversion in the entire transfer wiring, and then secondary inversion for returning the logic of the display data to the original logic is performed by a secondary data inversion circuit of a transfer destination (refer to Patent Document 1, for example). In this method, when display data constituted by the CMOS signals having a 18-bit width of 6 bits by 3 dots (R, G, B) are transferred, a logic inversion change before or after each bit in the 18-bit display data from the "H" level to the "L" level or from the "L" level to the "H" level is detected by the controller of the transfer source. Then, when the number of the changed bits is 13 bits that is larger than half of the number of 18 bits, for example, a data inversion signal INV at the "H" level is generated. Then, the logics of 18 bits are inverted at the primary data inversion circuits for the 18 bits provided near output terminals of the controller, according to this data inversion signal INV. With this arrangement, in the transfer wiring with the 18-bit width, 13 bits of the 18 bits are not inverted, so that only five bits are inverted. The frequencies of inversion can be reduced, so that the EMI noise and the current consumption can be reduced. Then, in order to return the display data with the 18 bit width to its original logic state, the display data are inverted again to the logics of the 18 bits by the secondary data inversion circuits for the 18 bits, provided near input terminals of the data driver of the transfer destination.

As an other method of solving the above-mentioned problem, a low voltage differential signaling interface is employed. As its typical one, an interface using an RSDS (Reduced Swing Differential Signaling) system (which will be referred to as an RSDS interface) (refer to Patent Document 2) is used.

[Patent Document 1]

JP Patent Kokai Publication No. JP-P2003-84726A (FIG. 9)

[Patent Document 2]

JP Patent No. 3285332

SUMMARY OF THE DISCLOSURE

However, when the higher definition of the picture quality of the liquid crystal panel and the larger size of the liquid crystal panel are further progressed, and when the number of pixels is increased as in an SXGA (1280×1024 pixels) and further as in a UXGA (1600×1200 pixels), the problem came out in which the current consumption increased even if the above-mentioned two methods for solution were used. That is, the problem arose in which though the EMI noise and the current consumption in the wiring between the ICs could be reduced with the two methods, the EMI noise and the current consumption in the internal wiring after the display data have been input to the data driver increased.

Accordingly, an object of the present invention is to provide an electronic device that can reduce EMI noise and current consumption in the internal wiring after data have been input to a semiconductor integrated circuit device.

(1) In an electronic device of the present invention, data from a first semiconductor integrated circuit device are transferred to a plurality of second semiconductor integrated circuit devices. The electric device is adapted for a data transfer system in which when transferring the data constituted by CMOS signals, inversion before or after each CMOS signal bit is detected, thereby generating a data inversion signal according to the number of inverted bits, primary inversion of a data logic is performed at a transfer source according to the data inversion signal, and secondary inversion is performed so as to return the data logic to the original logic at a transfer destination. At least the transfer destination of the transfer source and the transfer destination is included in one of the second semiconductor integrated circuit devices.

Each of the second semiconductor integrated circuit devices includes a data capturing circuit for capturing the data. The data capturing circuit comprises: internal wiring for the data; data registers; and a circuit for secondary data inversion disposed immediately before inputs of the data to the data registers, for performing the secondary inversion of the data input through the internal wiring.

(2) In the electronic device according to item (1) described above, in the each of the second semiconductor integrated circuit devices, the data constituted by the CMOS signals and the data inversion signal are input from the first semiconductor integrated circuit device or a second semiconductor integrated circuit device in a preceding stage connected to one of the second semiconductor integrated circuit devices.

(3) In the electronic device according to item (1) described above, in the each of the second semiconductor integrated circuit devices, the data constituted by differential signals from the first semiconductor integrated circuit device or a second semiconductor integrated circuit device in a preceding stage connected to the one of the second semiconductor integrated circuit devices are converted to the data constituted by the CMOS signals, and the data inversion signal is generated inside the each of the second semiconductor integrated circuit devices.

(4) In the electronic device according to item (1) described above, the each of the second semiconductor integrated circuit devices comprises a receiving unit for selecting the data constituted by the CMOS signals or the data constituted by differential signals from the first semiconductor integrated circuit device or the second semiconductor integrated circuit device in a preceding stage connected to the each of the second semiconductor integrated circuit devices;

when the CMOS signals are selected, the data inversion signal is input from the first semiconductor integrated circuit device or the second semiconductor integrated circuit device in the preceding stage connected to the each of the second semiconductor integrated circuit devices; and when the differential signals are selected, the data inversion signal is generated at the receiving unit.

(5) In the electronic device according to item (4) described above, the second semiconductor integrated circuit devices are connected in cascade so that the data from the first semiconductor integrated circuit device are sequentially transferred;

to the second semiconductor integrated circuit device in a first stage, the data constituted by the differential signals from the first semiconductor integrated circuit device are transferred; and to the second semiconductor integrated circuit devices in second and subsequent stages, the data constituted by the CMOS signals from the second semiconductor integrated circuit device in the preceding stage connected to the each of the second semiconductor integrated circuit devices are transferred.

(6) In the electronic device according to item (5) described above, the receiving unit includes:

differential signal receivers each for receiving the differential signals including at least two bits of the data as a pair when the differential signals are selected and outputting the at least two bits of the data onto the same wiring as a time-multiplexed CMOS signal; and bypass circuits for bypassing the received CMOS signals from the differential signal receivers when the CMOS signals are selected.

(7) In the electronic device according to item (6) described above, the receiving unit includes:

frequency divider circuits each for frequency dividing the CMOS signal from one of the differential signal receivers by at least two with respect to the differential signals, for output as parallel one-bit CMOS signals.

(8) In the electronic device according to item (7) described above, the receiving unit further includes:

a data inversion signal generation circuit for generating the data inversion signal; and a primary data inversion circuit for performing the primary inversion of the data from the frequency divider circuits.

(9) In the electronic device according to any one of items (3) through (8) described above, the differential signal is one of an RSDS signal, a mini-LVDS signal, and a CMADS signal.

(10) In the electronic device according to any one of items (1) through (9) described above, the electronic device is adapted for use as a display device, the first semiconductor integrated circuit device is a control circuit, and the second semiconductor integrated circuit devices comprise data side driving circuits.

(11) In the electronic device according to item (10) described above, the electronic device is adapted for use as a liquid crystal display device.

According to the present invention described above, when the data are captured by the data registers through the internal wiring after having been input to the semiconductor integrated circuit device, the secondary data inversion circuit is disposed immediately before inputs of the data to the data registers. The data subjected to the primary inversion control according to the data inversion signal at the transfer source for the internal wiring is thereby subjected to the secondary inversion control at the secondary data inversion circuit to be returned to the original logic state. The frequencies of inversion of the data in the internal wiring are thereby reduced, so that EMI noise and current consumption in the internal wiring can be reduced.

The meritorious effects of the present invention are summarized as follows.

According to the present invention, the EMI noise and the current consumption in the internal wiring after data have been input to the semiconductor integrated circuit device can be reduced.

PREFERRED EMBODIMENTS OF THE INVENTION

Figure 1:
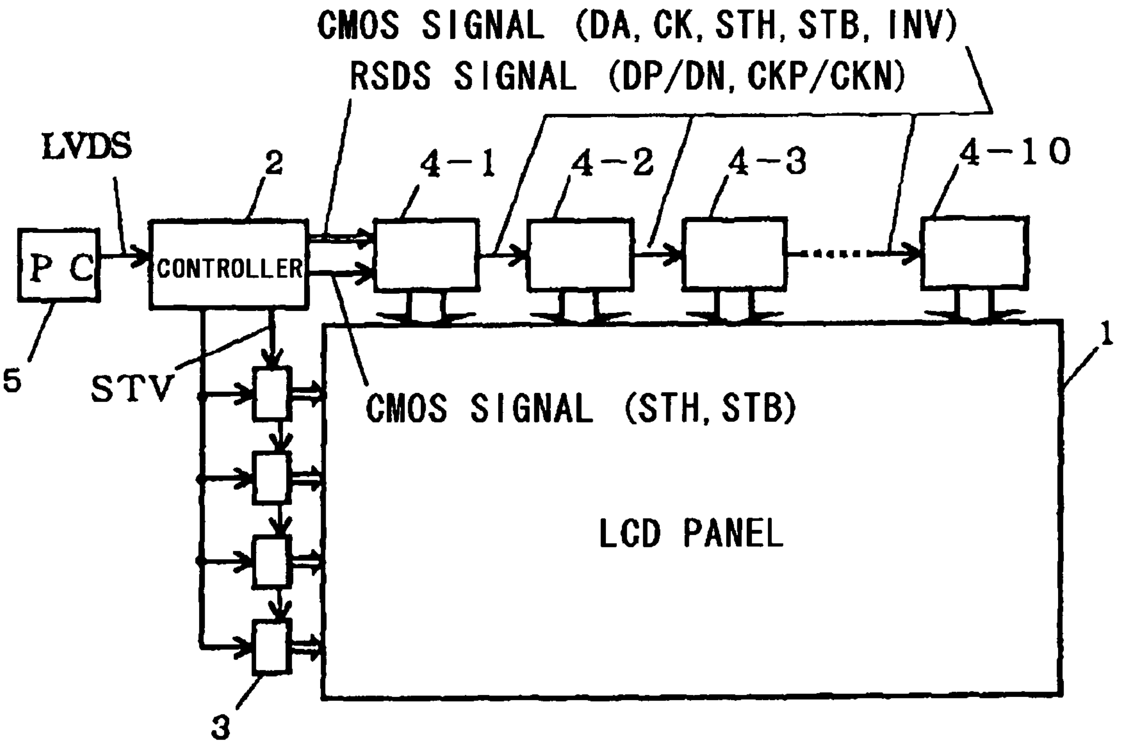
FIG. 1 is a block diagram showing a general configuration of a liquid crystal display module in an embodiment of the present invention.

In order to make a clear distinction between a CMOS signal and an RSDS signal with respect to reference characters in display data and timing signals to be used in the following description, following definitions will be given:

(1) display data DATA: no distinction between the CMOS signal and the RSDS signal;

(2) display data DA: the CMOS signals;

(3) display data D00 to D05, D10 to D15, D20 to D25: the CMOS signals;

(4) display data DN/DP: the RSDS signals;

(5) display data D00N/D00P to D02N/D02P, D10N/D10P to D12N/D12P, D20N/D20P to D22N/D22P: the RSDS signals;

(6) clock signal CLK: no distinction between the CMOS signal and the RSDS signal;

(7) clock signal CK: the CMOS signal;

(8) clock signal CKN/CKP: the RSDS signal;

(9) start signal STH, latch signal STB, data inversion signal INV: the CMOS signals.

An embodiment of the present invention will be described below with reference to the drawings. As shown in FIG. 1, a liquid crystal display module of a liquid crystal display device includes a liquid crystal panel 1, a controller 2, scanning drivers 3, and data drivers 4. Though the details of the liquid crystal panel 1 are not illustrated, the liquid crystal panel 1 is constituted from a structure including a semiconductor substrate with transparent pixel electrodes and thin film transistors (TFTs) disposed thereon, an opposing substrate with one transparent electrode formed on an entire surface thereof, and a liquid crystal sealed between these two opposing substrates. Then, by controlling the TFTs each having a switching function, a predetermined voltage is applied to each pixel electrode, and the transmissivity or reflectivity of the liquid crystal is changed by a potential difference between each pixel electrode and the electrode on the opposing substrate. An image is thereby displayed. On the semiconductor substrate, data lines for sending gray-scale voltages applied to the respective pixel electrodes and scanning lines each for sending a TFT switching control signal (scanning signal) are wired. A case where the definition of the liquid crystal panel 1 is that of an SXGA (1280×1024 pixels: one pixel being constituted from three dots of R, G, B) and display of 262144 colors (each of R, G, B being constituted from 64 gray scales) is performed will be taken as an example, and a description will be given.

As the scanning lines of the liquid crystal panel 1, 1024 scanning lines are disposed, corresponding to 1024 pixels in a vertical direction. As the data lines, 3840 (1280×3) data lines are disposed, corresponding to 1280 pixels in a horizontal direction because one pixel is constituted from three dots of the R, G, B. As the scanning drivers 3, four scanning drivers, each of which is used for 256 gate lines of 1024 gate lines, are disposed. As the data drivers 4, ten (4-1, 4-2, . . . , 4-10) data drivers, each of which is used for 384 data lines of 3840 data lines, are disposed.

To the controller 2, display data and timing signals are transferred from a PC (personal computer) 5 through an LVDS (low voltage differential signaling) interface, for example. From the controller 2 to the scanning drivers 3, clock signals or the like are transferred in parallel with each of the scanning drivers 3, and a start signal STV for vertical synchronization is transferred to the scanning driver 3 in a first stage, and then sequentially transferred to the scanning drivers 3 in second and later stages connected in cascade. The start signal STH for horizontal synchronization and the latch signal STB constituted by the CMOS signals are transferred to a data driver 4-1 in the first stage through a CMOS interface, and the display data DN/DP and the clock signal CKN/CKP constituted by the RSDS signals are transferred through an RSDS interface. The display data DA, clock signal CK, start signal STH, latch signal STB, and data inversion signal INV constituted by the CMOS signals are sequentially transferred to the data drivers 4-2, 4-3, . . . , and 4-10 in the second and later stages, connected in cascade, from the data driver 4-1 in the first stage, through the CMOS interface. A logic change before or after each bit of the display data DA within the data driver 4-1 in the first stage is detected, and the data inversion signal INV is generated based on the number of one or more changed bits.

A scanning signal in a pulse form is sequentially transmitted to a scanning line on the liquid crystal panel 1 from a scanning driver 3. TFTs connected to the scanning line to which a pulse is applied are all turned on. At this point, gray-scale voltages are supplied to the data lines of the liquid crystal panel 1 from the respective data drivers 4 and applied to pixel electrodes through the TFTs which have been turned on. Then, when the TFTs connected to the scanning line to which no pulse is applied any longer are turned off, potential differences between the pixel electrodes and the opposing substrate electrode are held for a period until subsequent gray-scale voltages are applied to the pixel electrodes. Then, by sequential pulse application, predetermined gray-scale voltages are applied to all pixel electrodes. By performing gray-scale voltage rewriting in each frame period, an image can be displayed.

Figure 2:
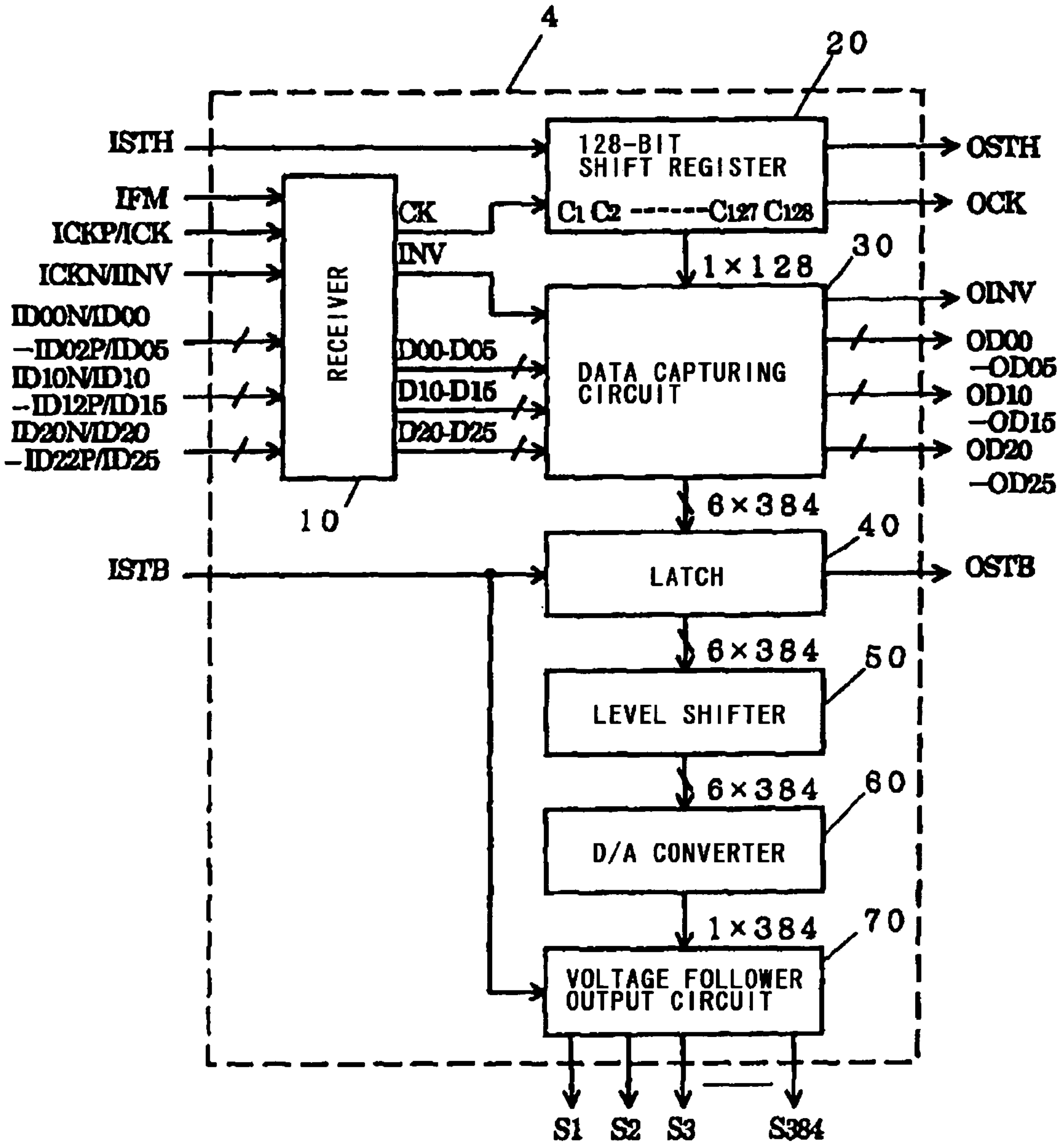
FIG. 2 is a block diagram showing a general configuration of a data driver 4 used in the liquid crystal display module shown in FIG. 1.

A data driver 4 has a 384-output configuration in which display data of R, G, B each constituted from six bits are input thereto, respectively, for respective 64 gray-scale display of the R, G, B, corresponding to the 384 data lines, and one gray-scale voltage corresponding to the logic of the display data among the 64 gray scales is output therefrom, respectively. As a specific circuit configuration, as shown in FIG. 2, each data driver 4 includes a receiver 10 that constitutes an interface circuit for chip-to-chip data transfer. As a circuit structure for performing serial/parallel conversion of the digital display data DA and performing further conversion to an analog gray-scale voltage corresponding to the logic of the display data DA, there are a shift register 20, a data capturing circuit 30, a latch 40, a level shifter 50, a digital-to-analog conversion circuit (which will be hereinafter referred to as a D/A converter) 60 and a voltage follower output circuit 70. Incidentally, though the data driver 4 has a power supply circuit for operating each of the circuits described above, its illustration and description will be omitted.

Each of input terminals of the data driver 4 shown in FIG. 2 will be described. An ISTH terminal is the input terminal of the start signal STH, and the start signal STH is input to the shift register 20. An ISTB terminal is the input terminal of the latch signal STB, and the latch signal STB is input to the latch 40 and the voltage follower output circuit 70. An IFM terminal is the terminal for selecting the mode of the CMOS interface or the RSDS interface. To the IFM terminal, a fixed potential at an "H" level or an "L" level is supplied as an interface mode selection signal, and its potential is input to the receiver 10. When the IFM terminal is at the "H" level, ICKP/ICK and ICKN/IINV terminals are the input terminals of the clock signal CKN/CKP. When the IFM terminal is at the "L" level, the ICKP/ICK terminal is the input terminal of the clock signal CK, and the ICKN/IINV terminal is the input terminal of the data inversion signal INV. The clock signals CKN/CKP and CK and the data inversion signal INV are input to the receiver 10, respectively. An ID00N/ID00-

ID02P/ID25 terminal, an ID10N/ID10-ID12P/ID15 terminal, and an ID20N/ID20-ID22P/ID25 terminal are the input terminals of the display data DATA of a 18-bit width constituted from 6 bits for gray scale display by three dots of the R, G, B (one pixel). When the IFM terminal is at the "H" level, they are the input terminals of the display data D00N/D00P to D02N/D02P, D10N/D10P to D12N/D12P, and D20N/D20P to D22N/D22P (which will be hereinafter referred to as DN/DP) constituted by the RSDS signals. When the IFM terminal is at the "L" level, they are the input terminals of the display data D00 to D05, D10 to D15, and D20 to D25 (which will be hereinafter referred to as DA) constituted by the CMOS signals. Each of the display data DATA described above is input to the receiver 10, respectively.

Each of output terminals of the data driver 4 shown in FIG. 2 will be described. An OSTH terminal is the output terminal of the start signal STH, and the start signal STH is output from the shift register 20. An OCK terminal is the output terminal of the clock signal CK, and the clock signal CK is output from the shift register 20. An OSTB terminal is the output terminal of the latch signal STB, and the latch signal STB is output from the latch 40. An OINV terminal is the output terminal of the data inversion signal INV, and the data inversion signal INV is output from the data capturing circuit 30. An OD00-OD05 terminal, an OD10-OD15 terminal, an OD20-OD25 terminal are the output terminals of the display data DA, and each of the display data DA is output from the data capturing circuit 30, respectively.

Figure 3:
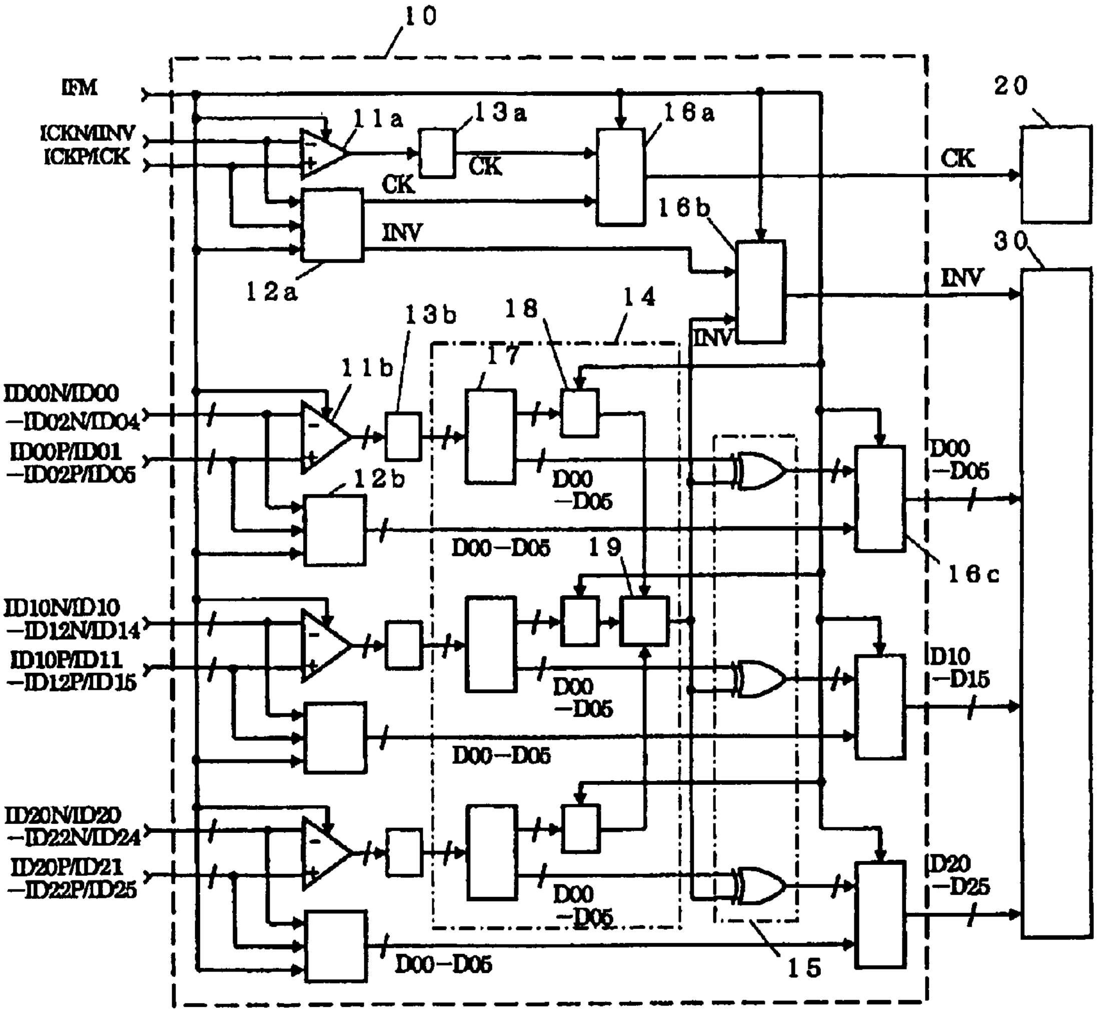
FIG. 3 is a circuit diagram showing a receiver 10 used in the data driver 4 shown in FIG. 2.

The receiver 10 that constitutes the interface circuit for chip-to-chip data transfer will be described. The receiver 10 receives the clock signal CLK and the display data DATA constituted by the RSDS signals or the CMOS signals, and outputs the clock signal CK and the display data DA constituted by the CMOS signals to the shift register 20 and the data capturing circuit 30 inside the data driver 4. As shown in FIG. 3, the receiver 10 includes an RSDS receiver 11*a* to which the clock signal CKN/CKP is input, RSDS receivers 11*b* to which the display data DN/DP are input, a bypass circuit 12*a* by which the clock signal CK and the data inversion signal INV are bypassed, bypass circuits 12*b* by which the display data DA are bypassed, a frequency divider circuit 13*a* for the output of the RSDS receiver 11*a*, frequency divider circuits 13*b* for the outputs of the RSDS receivers 11*b*, a data inversion signal generation circuit 14, a primary data inversion circuit 15, a selector 16*a* for the clock signal CK, a selector 16*b* for the data inversion signal INV, and selectors 16*c* for the display data DA.

When the IFM terminal is at the "H" level, an internal bias signal is turned on, so that each of the RSDS receiver 11*a* and the RSDS receivers 11*b* becomes an operation state in which reception of the clock signal CKN/CKP and the display data DN/DP is possible. When the IFM terminal is at the "L" level, by turning off of the internal bias signal, each of the RSDS receiver 11*a* and the RSDS receivers 11*b* becomes inoperative, so that current consumption is reduced.

Figure 4A:
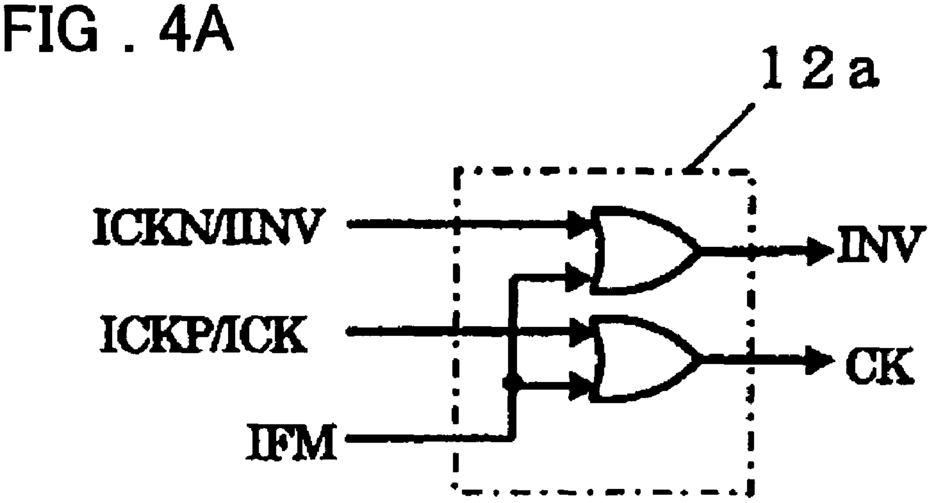
FIGS. 4A and 4B include circuit diagrams showing bypass circuits 12 used in the receiver 10 shown in FIG. 3.
Figure 4B:
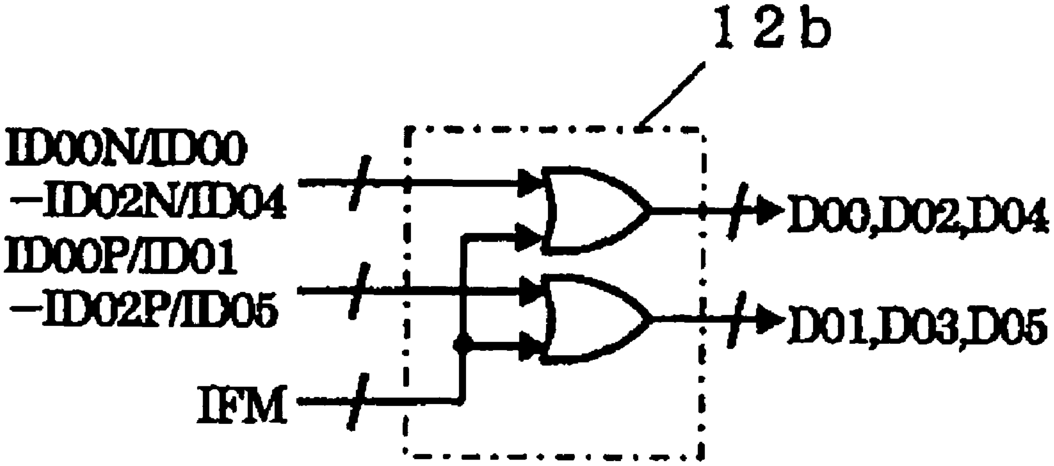
Figure 5:
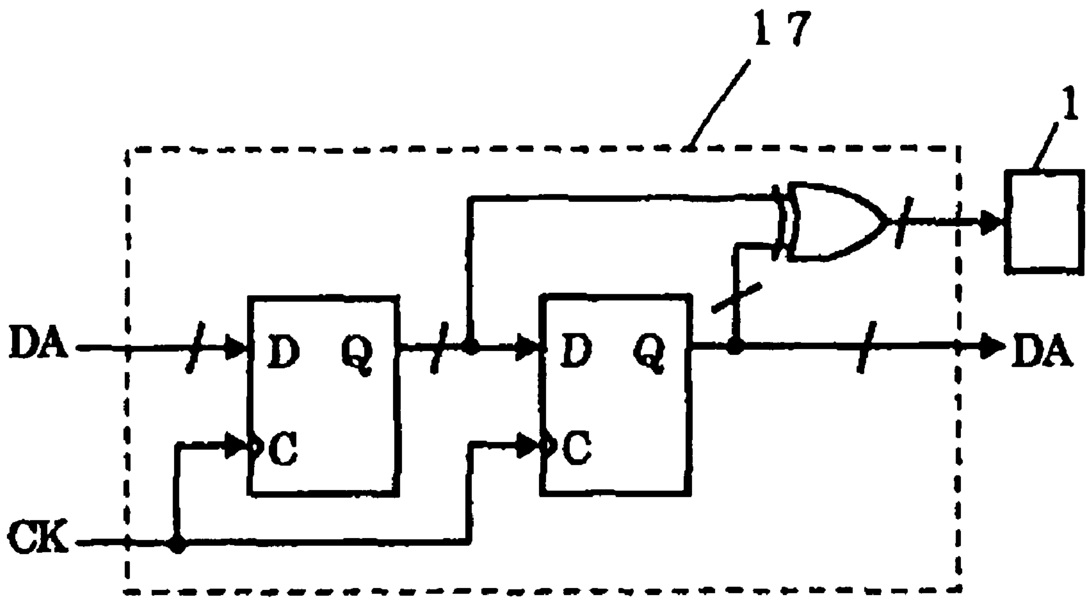
FIG. 5 is a circuit diagram showing a data inversion signal generation circuit 14 used in the receiver 10 shown in FIG. 3.

Each of the bypass circuit 12*a* and the bypass circuits 12*b* is constituted from two OR circuits as shown in FIGS. 4A and 4B, for example. When the IFM terminal is at the "L" level, the clock signal CK, data inversion signal INV, and display data DA are bypassed. When the IFM terminal is at the "H" level, bypassing of the CMOS signal is disabled.

The frequency divider circuit 13*a* frequency-divides the clock signal CK output from the RSDS receiver 11*a* by two, for output through one line. Each of the frequency divider circuits 13*b* separates the display data D00 to D01, D02 to D03, . . . , D24 to D25 obtained by time multiplexing two-bit display data onto the same wiring into one-bit data D00, D01, . . . , D24, and D25, for output through two lines.

The data inversion signal generation circuit 14 includes data inversion detection circuits 17, first determination circuits 18, and a second determination circuit 19. Three data inversion detection circuit 17 are included so as to correspond to the respective six-bit display data DA of the R, G, B. In order to detect a change before or after each bit of the six bits, each of the data inversion detection circuits 17 is constituted from flip-flops of a two-stage cascade connection and an EXOR circuit for outputting an exclusive OR of outputs of the respective stages. From the EXOR circuit, the "L" level is output for a bit with no change made before or after the bit, and the "H" level is output for the bit with a change made before or after the bit. From the flip-flop in the second stage, the display data DA is output. Three first determination circuits 18 are included so as to correspond to each of the data inversion detection circuits 17. When the IFM terminal is at the "H" level, the first determination circuits 18 become an operation state capable of making determinations. When the IFM terminal is at the "L" level, the first determination circuits 18 become inoperative, thereby reducing current consumption. Each of the first determination circuits 18 detects the number of changed bits among the six bits, and outputs the "H" level when the number of the changed bits is four or more, for example. The second determination circuit 19 detects the number of "H" level outputs of the outputs of the three first determination circuits 18. When the number of the "H" level outputs is two or more, the second determination circuit 19 outputs the "H" level. The output of the second determination circuit 19 becomes the data inversion signal INV.

Each primary data inversion circuit 15 is constituted from an EXOR circuit. When the IFM terminal is at the "H" level, inversion control of the display data DA from the data inversion signal generation circuit 14 is performed according to the data inversion signal INV from the data inversion signal generation circuit 14.

When the IFM terminal is at the "H" level, the selector 16*a* selects the clock signal CK from the frequency divider circuit 13*a*, for output. When the IFM terminal is at the "L" level, the selector 16*a* selects the clock signal CK from the bypass circuit 12*a*, for output. When the IFM terminal is at the "H" level, the selector 16*b* selects the data inversion signal INV from the data inversion signal generation circuit 14, for output. When the IFM terminal is at the "L" level, the selector 16*b* selects the data inversion signal INV from the bypass circuit 12*a*, for output. When the IFM terminal is at the "H" level, the selectors 16*c* select the display data D0 to D01, D02 to D03, . . . , D24 to D25 from the primary data inversion circuit 15, for output. When the IFM terminal is at the "L" level, the selectors 16*c* select the display data D00 to D01, D02 to D03, . . . , and D24 to D25 from the bypass circuits 12*b*, for output.

Figure 6:
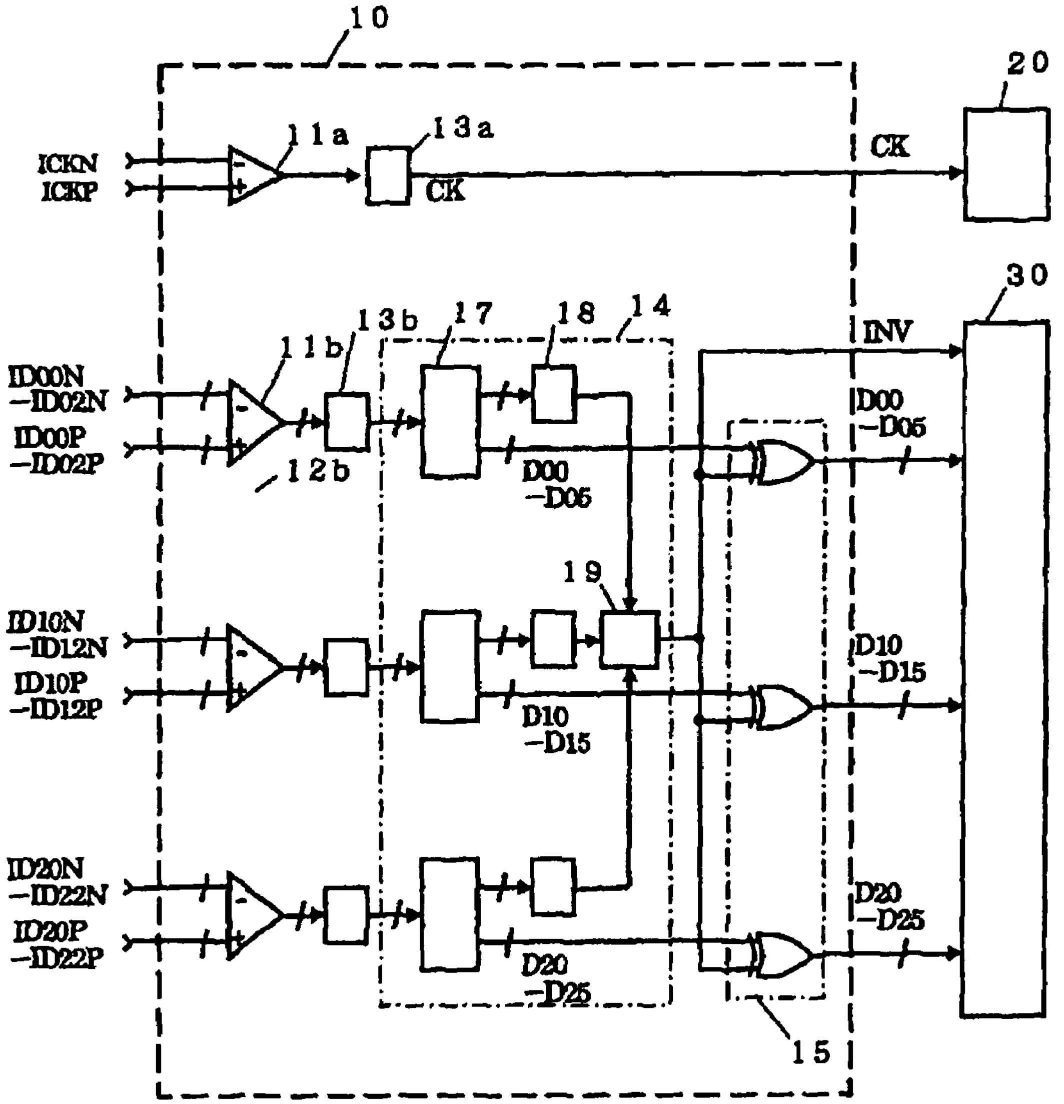
FIG. 6 is a diagram showing an operation state of the receiver 10 shown in FIG. 3 when an IFM is “H”

An operation of the receiver 10 when the IFM terminal is at the "H" level will be described. Each of the RSDS receiver 11*a* and the RSDS receivers 11*b* becomes the operative, and in the bypass circuit 12*a* and the bypass circuits 12*b*, CMOS signal bypassing is disabled. The selector 16*a* selects the output of the frequency divider circuit 13*a*. The selector 16*b* selects the output of the data inversion signal generation circuit 14, and the selectors 16*c* select outputs of the primary data inversion circuit 15. By these operations, the receiver 10 functions as the RSDS receiver, as shown in FIG. 6. Accordingly, when the clock signal CKN/CKP and the display data DN/DP are input to the receiver 10 at this point, the RSDS receiver 11*a* and the RSDS receivers 11*b* receive these. From the receiver 10, the clock signal CK from the frequency divider circuit 13*a* is output, and the display data DA from the primary data inversion circuit 15 are output.

Figure 7:
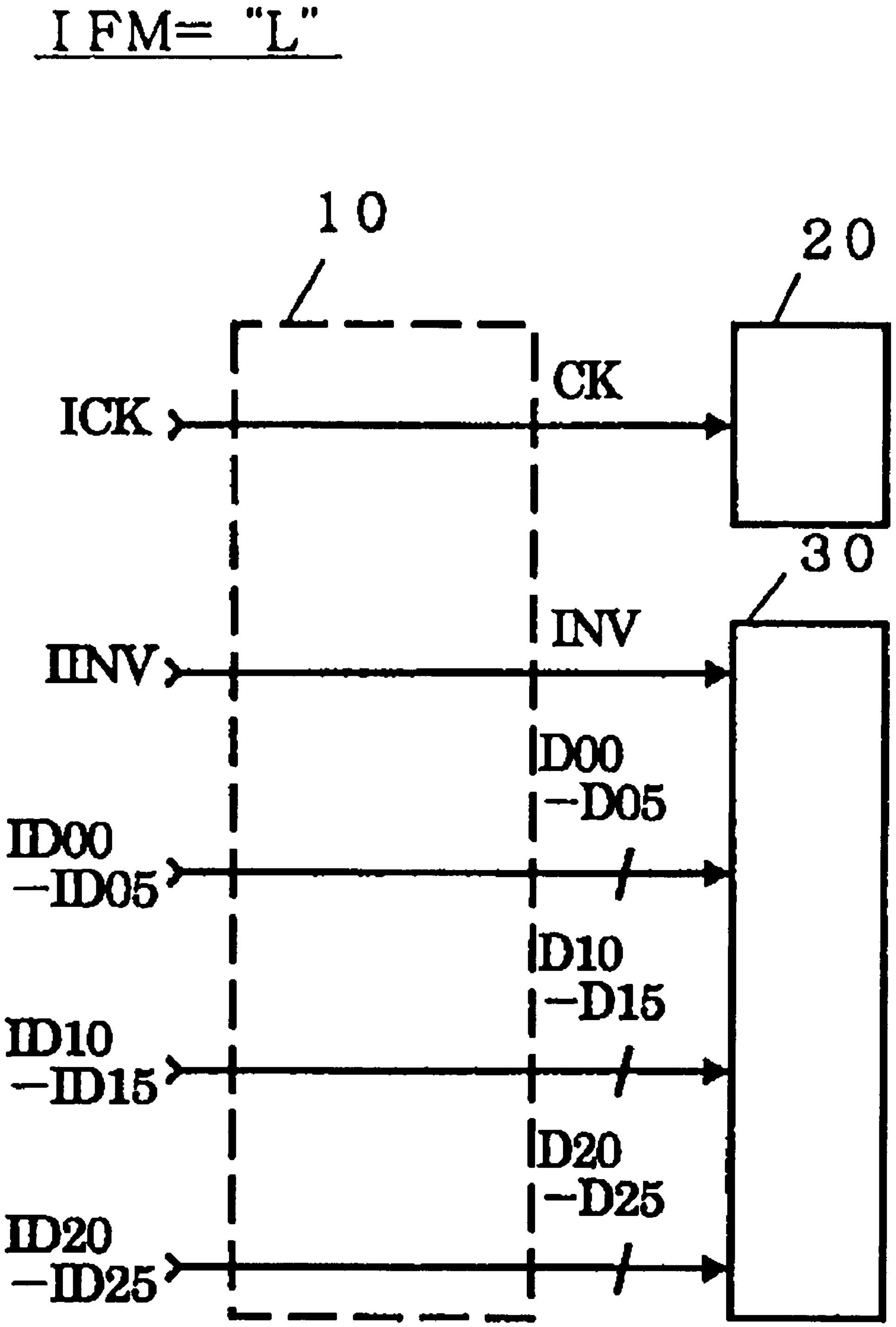
FIG. 7 is a diagram showing an operation state of the receiver 10 shown in FIG. 3 when the IFM is “L”

Next, an operation of the receiver 10 when the IFM terminal is at the "L" level will be described. Each of the RSDS receiver 11*a* and the RSDS receivers 11*b* becomes inoperative, and the bypass circuits 12*a* and 12*b* bypass the clock signal CK, data inversion signal INV, and display data DA. The selector 16*a* selects the clock signal output of the bypass circuit 12*a*. The selector 16*b* selects the data inversion signal output of the bypass circuit 12*a*. The selectors 16*c* select the outputs of the bypass circuits 12*b*. By these operations, the receiver 10 functions as a CMOS receiver, as shown in FIG. 7. Accordingly, when the clock signal CK, data inversion signal INV, and display data DA are input to the receiver 10 at this point, the RSDS receiver 12*a* and the RSDS receivers 12*b* bypass these CMOS signals. From the receiver 10, the clock signal CK and the data inversion signal INV from the bypass circuit 12*a* are output, and the display data DA from the bypass circuits 12*b* are output.

Referring again to FIG. 2, the shift register 20, data capturing circuit 30, latch 40, level shifter 50, D/A converter 60, and voltage follower output circuit 70 will be described. The shift register 20 is constituted from 128 bits (three data lines for the R, G, B being assigned to one bit) register, corresponding to the 384 data lines. For each horizontal period for scanning one of a plurality of scanning lines of the liquid crystal panel 1, the start signal STH at the "H" level is read at the front and back edges of the clock signal CK, control signals C1, C2, . . . , C128 for data capturing are sequentially generated, for supply to the data capturing circuit 30.

Figure 8:
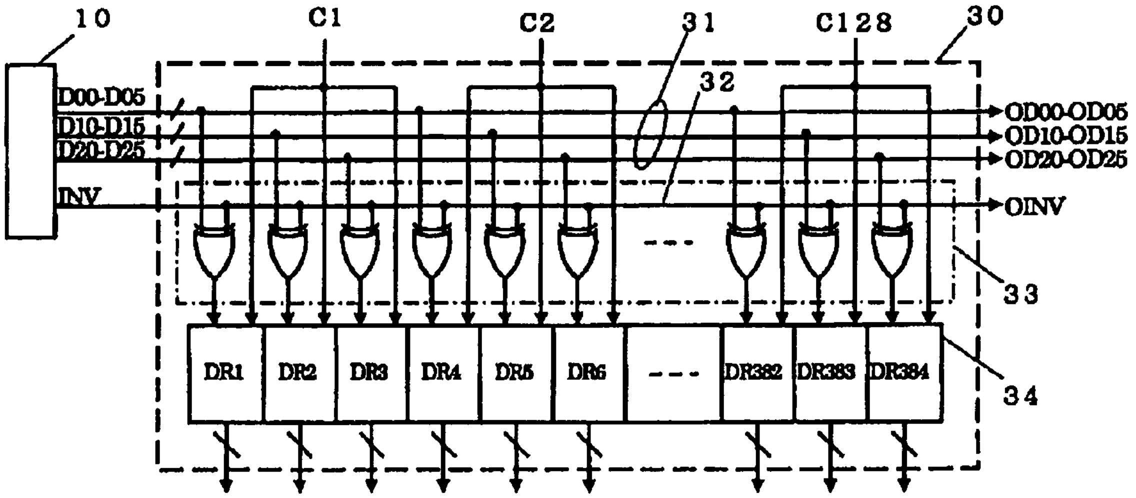
FIG. 8 is a circuit diagram showing a data capturing circuit 30 used in the data driver 4 shown in FIG. 2.

As shown in FIG. 8, the data capturing circuit 30 includes internal wiring 31 for the display data DA, internal wiring 32 for the data inversion signal INV, a secondary data inversion circuit 33, and data registers 34 (DR1 . . . DR384). The internal wiring 31 connects the display data DA output terminals of the receiver 10 and an OD00-OD05 terminal, an OD10-OD15 terminal, and an OD20-OD25 terminal. The internal wiring 32 connects the data inversion signal INV output terminal of the receiver 10 and an OINV terminal. The secondary data inversion circuit 33 is constituted from EXOR circuits with an 18-bit width of 6 bits by 3 dots (R, G, B)×128 bits, corresponding to the 384 data lines. The secondary data inversion circuit 33 is disposed immediately before the display data inputs of the data registers 34. The display data DA are input to one input terminals of the EXOR circuits through the internal wiring 31, and the data inversion signal INV is input to the other input terminals of the EXOR circuits through the internal wiring 32. For each horizontal period, the data registers 34 capture the display data DA of 128 bits by the 18-bit width of 6 bits by 3 dots (R, G, B) for one scanning line, supplied from the secondary data inversion circuit 33 at the timings of the rear edges of control signals C1, C2, . . . , and C128 of the shift register 20, corresponding to the 384 data lines.

The latch 40 holds the display data DATA captured by the data registers 34 at the timing of the front edge of the latch signal STB, for collective supply to the level shifter 50, for each horizontal period. The level shifter 50 increases the voltage level of the display data DA from the latch 40, for supply to the D/A converter 60. The D/A converter 60 supplies one gray scale voltage of 64 gray scales corresponding to the logic of the display data DA to the voltage follower output circuit 70, for each 6-bit display data DA corresponding to each of the 384 data lines, based on the display data DA from the level shifter 50. The voltage follower output circuit 70 outputs the gray-scale voltages from the D/A converter 60 by enhancing its driving capability at the timing of the rear edge of the latch signal STB, as outputs S1 to S384.

Figure 9:
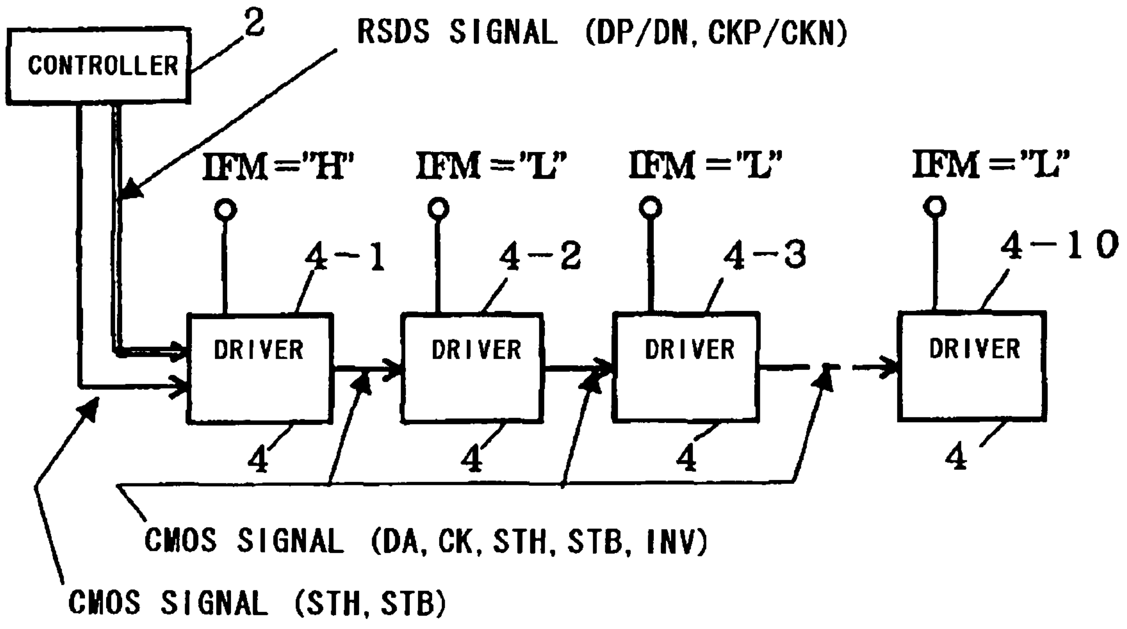
FIG. 9 is a diagram explaining transfer of various signals between a controller 2 and the data drivers 4 shown in FIG. 1.

With regard to transfer of various signals between the controller 2 and the data driver 4 and between the respective data drivers 4 in the liquid crystal display module shown in FIG. 1, the controller 2, data drivers 4 (4-1 . . . 4-10), various signal lines from the controller 2 to the data drivers 4 will be shown in FIG. 9, for description. The start signal STH and the latch signal STB are the CMOS signals, which are transferred to the data driver 4-1 from the controller 2, and sequentially transferred from the data driver 4-1 to each of the data drivers 4-2, 4-3, . . . , 4-10 connected in cascade.

Transfer of the clock signal CLK, display data DATA, and data inversion signal INV will be described. The potential level at the IFM terminal of the data driver 4-1 is set to the "H" level, and the potential levels of the IFM terminals of the data driver 4-2, 4-3, . . . , 4-10 are set to the "L" level. With this arrangement, each of the RSDS receiver 11*a* and the RSDS receivers 11*b* of the data driver 4-1 becomes operative. As shown in FIG. 6, the receiver 10 of the data driver 4-1 functions as the RSDS receiver, and an RSDS transmitter of the controller 2, not shown and the receiver 10 of the data driver 4-1 constitute the RSDS interface. Accordingly, the clock signal CKN/CKP and the display data DN/DP from the controller 2 are transferred to the data driver 4-1 through the RSDS interface.

In the data driver 4-1, the clock signal CKN/CKP is converted to the clock signal CK at the receiver 10, and is transferred to the OCK terminal through the shift register 20. The display data DN/DP is converted to the display data DA at the receiver 10. At the data inversion signal generation circuit 14 of the receiver 10, inversion before or after each bit of the display data DA is detected, and the data inversion signal INV corresponding to the number of inverted bits is generated. Primary inversion control is performed over the display data DA at the primary data inversion circuit 15 of the receiver 10, according to the data inversion signal INV, and the display data DA are transferred to the data capturing circuit 30, together with the data inversion signal INV. The display data DA and the data inversion signal INV transferred to the data capturing circuit 30 are transferred to the OD00-OD05 terminal, OD10-OD15 terminal, and OD20-OD25 terminal and the OINV terminal through the internal wiring 31 and 32, and also transferred to the secondary data inversion circuit 33. Secondary inversion control over the display data DA is performed at the secondary data inversion circuit 33 according to the data inversion signal INV, for transfer to the data registers 34. Since the secondary inversion control is performed over the display data DA immediately before input to the data registers 34 according to the data inversion signal INV at this point, the frequencies of inversion of the display data DA in the internal wiring 31 are reduced, so that EMI noise and current consumption in the internal wiring 31 can be reduced.

Each of the RSDS receiver 11*a* and the RSDS receivers 11*b* of the data driver 4-2 become inoperative, for bypassing, and as shown in FIG. 7, the receiver 10 of the data driver 4-2 functions as the CMOS receiver. Accordingly, the clock signal CK, data inversion signal INV, and display data DA from the data driver 4-1 are transferred to the data driver 4-2. In the data driver 4-2, the clock signal CK is transferred to the OCK terminal through the shift register 20. The display data DA are transferred to the data capturing circuit 30, together with the data inversion signal INV. The display data DA and the data inversion signal INV, which have been transferred to the data capturing circuit 30, are transferred to the OD00-OD05 terminal, OD10-DO15 terminal, OD20-OD25 terminal, and the OINV terminal, and also transferred to the secondary data inversion circuit 33, as in the data driver 4-1. Then, as in the data driver 4-1, the display data DA are transferred to the data registers 34, so that the EMI noise and the current consumption in the internal wiring 31 can be reduced.

The data drivers 4-3, . . . , and 4-10 in the third and subsequent stages also function like the data driver 4-2: the clock signal CK and the display data DA are sequentially transferred to the data drivers 4-3, and 4-10 through CMOS interface circuits. Since each of the RSDS receivers 11*a* and the RSDS receivers 11*b* of the data drivers 4-2, 4-3, . . . , and 4-10 in the second and subsequent stages has become inoperative, current consumption in these receivers can be reduced.

Next, timing operations when the display data DATA for the data driver 4-3 are input to the data driver 4-1 and then transferred to the data driver 4-3 will be described with reference to FIG. 10. To the data driver 4-1, the clock signal CKN/CKP as the RSDS signal of 75 MHz, for example, is input at timings shown in FIG. 10(*a*), and the display data DN/DP are input at timings shown in FIG. 10(*c*), in synchronization with the clock signal CKN/CKP. In response to the 259th clock signal CKN/CKP shown in FIG. 10(*a*), the display data DN/DP for the outputs S1 to S3 of the data driver 4-3 shown in FIG. 10(*c*) are input. Likewise, in response to the 260th clock signal CKN/CKP, the display data DN/DP for the outputs S4 to S6 of the data driver 4-3 are input. A start signal STH1 is input to the data driver 4-1 at a timing earlier than that illustrated, and the ISTH terminal in FIG. 10(*b*) is at the "L" level.

The clock signal CKN/CKP is frequency divided by two at the receiver 10 of the data driver 4-1, and becomes a clock signal CK1 (not shown) of 37.5 MHz. The clock signal is transferred within the data driver 4-1, and is input to the data driver 4-2 as a clock signal CK2 after a delay t of $t_{p1}$ (wherein $t_{p1}$ being equal to 15 ns, for example) from the clock signal CKN/CKP, as shown in FIG. 10(*d*). The display data DN/DP are frequency divided by two at the receiver 10 in the data driver 4-1 to become the display data D00 to D05, D10 to D15, and D20 to D25 of 37.5 MHz (not shown) and are transferred within the data driver 4-1. Then, as shown in FIG. 10(*f*), the display data DN/DP are input to the data driver 4-2 after the delay $t=t_{PLH2}$ ($t_{PHL2}$) ($t_{PLH2}$ and $T_{PLH2}$ being −3 to +1 ns, for example) from the clock signal CK2, for input to the data driver 4-2. The display data DA for the outputs S1 to S3, S4 to S6 of the data driver 4-3 shown in FIG. 10(*f*) are input, in response to the (2-1)th clock signal CK2 shown in FIG. 10(*d*). Likewise, the display data DA for the outputs S7 to S9, S10 to S12 of the data driver 4-3 are input, in response to the (2-2)th clock signal CK2. The start signal STH1 is transferred within the data driver 4-1, and is input to the data driver 4-2 as a start signal STH2 at a timing earlier than that illustrated. In FIG. 10(*e*), the ISTH terminal is at the "L" level.

Figure 10:
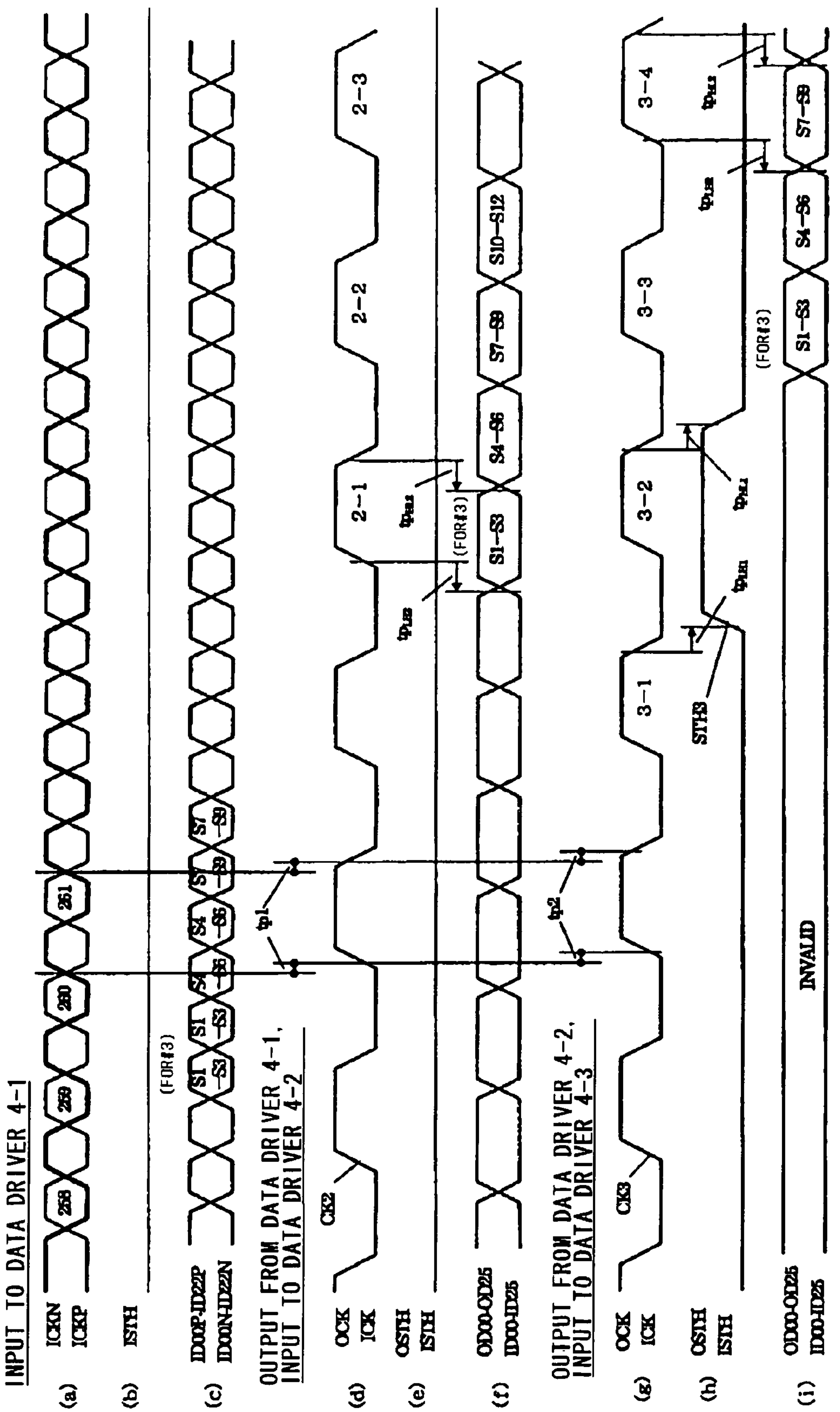
FIG. 10 is a timing chart explaining chip-to-chip transfer of clock signals and display data between the data drivers shown in FIG. 9.

The clock signal CK2 is transferred within the data driver 4-2, and is input to the data driver 4-3 as a clock signal CK3 after the delay $t=t_{p2}$ ($t_{p2}$ being 15 ns, for example) from the clock signal CK2, as shown in FIG. 10(*g*). The start signal STH2 is transferred within the data driver 4-2, and is input, as a start signal STH3, after the delay $t=t_{PLH1}$ (the tPLH1 being −3 to +1 ns, for example) from the rear edge of the (3-1)th clock signal CK3 as the front edge thereof and after the delay $t=t_{PHL1}$ (the $t_{PHL1}$ being −3 to +1 ns, for example) from the rear edge of the (3-2)th clock signal CK3 as the rear edge thereof. The display data DA are transferred within the data driver 4-2, and as shown in FIG. 10(*i*), the display data DA are input to the data driver 4-3 after the delay t of $T_{PLH2}$ ($T_{PLH2}$) from the clock signal CK3. The display data DA for the outputs S1 to S3, S4 to S6 of the data driver 4-3 shown in FIG. 10(*i*) are input, in response to the (3-3)th clock signal CK3 shown in FIG. 10(*g*). Likewise, the display data DA for the outputs S7 to S9, S11 to S12 of the data driver 4-3 are input, in response to the (3-4)th clock signal CK3.

As described above, in the data driver 4-1, to which the display data DN/DP constituted by the RSDS signals are input, the display data DN/DP are converted to the display data DA constituted by the CMOS signals at the receiver 10. Then, the data inversion signal INV is generated inside the receiver 10, and the primary inversion control is performed over the display data DA which have been converted to the CMOS signals, according to the data inversion signal INV, for transfer to the data capturing circuit 30. The display data DA which have been subjected to the primary inversion control are transferred through the internal wiring 31. Then, in order to return the data to the original logic state immediately before input to the data registers 34, the secondary inversion control over the display data DA according to the data inversion signal INV is performed. With this arrangement, the frequencies of inversion of the display data DA in the internal wiring 31 are reduced, so that the EMI noise and the current consumption in the internal wiring 31 can be reduced.

In each of the data drivers 4-2, 4-3, . . . , and 4-10 to which the display data DA constituted by the CMOS signals are input, the display data DA which have been subjected to the primary inversion control by the data driver 4-1 are transferred to the data capturing circuit 30 through the receiver 10, without alteration. The display data DA transferred to the data capturing circuit 30 are transferred through the internal wiring 31. Then, in order to return the display data to the original logic state immediately before input to the data registers 34, the secondary inversion control according to the data inversion signal INV generated at the data driver 4-1 is performed. With this arrangement, in the data drivers 4-2, 4-3, . . . , and 4-10 as well, the frequencies of inversion of the display data DA in the internal wiring 31 are reduced, so that the EMI noise and the current consumption in the internal wiring 31 can be reduced.

Figure 11:
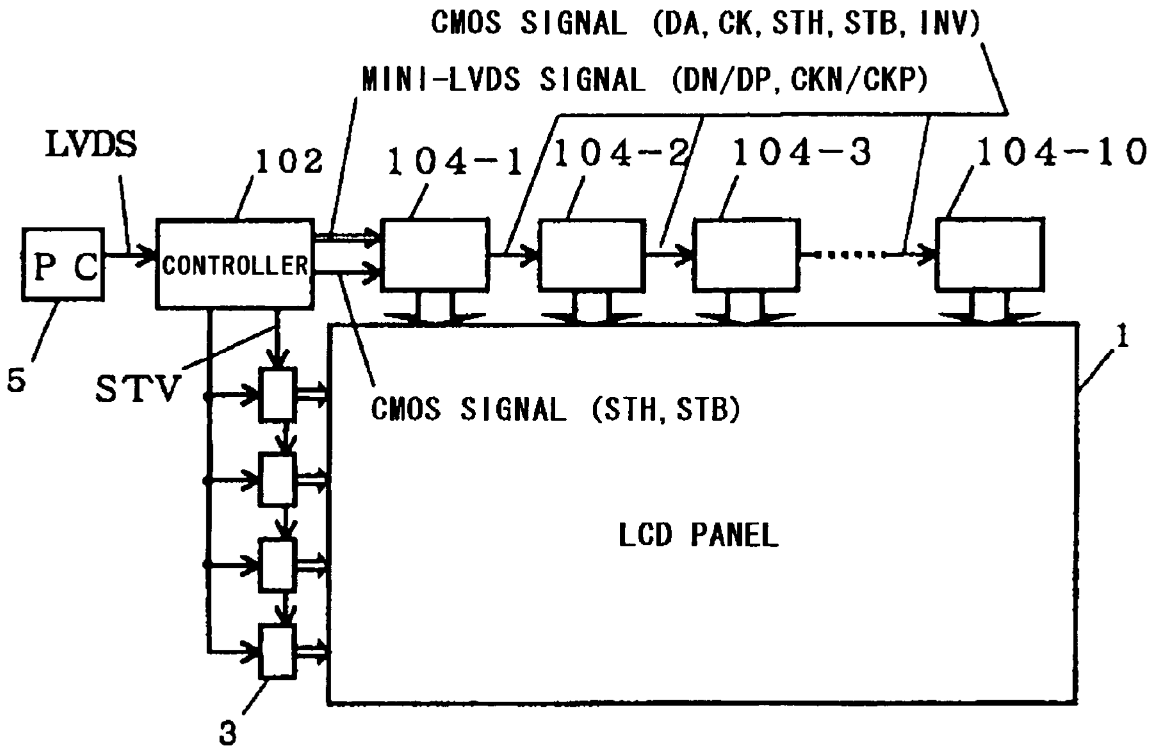
FIG. 11 is a block diagram showing a general configuration of a liquid crystal display module in a second embodiment of the present invention.

Next, a second embodiment of the present invention will be described with reference to FIG. 11. Incidentally, by assigning the same reference characters to the elements that are the same as those in FIG. 1, their description will be omitted. A difference from the liquid crystal device in FIG. 1 is that a controller 102 and data drivers 104 are included in place of the controller 2 and the data drivers 4, and that the display data DN/DP and the clock signal CKN/CKP constituted by mini-LVDS signals are transferred to a data driver 104-1 in the first stage from the controller 102 using a mini-LVDS (which is a trade mark of TEXAS INSTRUMENTS INCORPORATED) interface in place of the RSDS interface, as the low voltage differential signaling interface. For the data drivers 104, the same circuit configuration as that of the data drivers 4 shown in FIG. 2, except for use of mini-LVDS receivers in place of the RSDS receivers 11*a* and 11*b* of the receivers 10, can be used. Their operations are also the same, so that illustration and description of them will be omitted.

Figure 12:
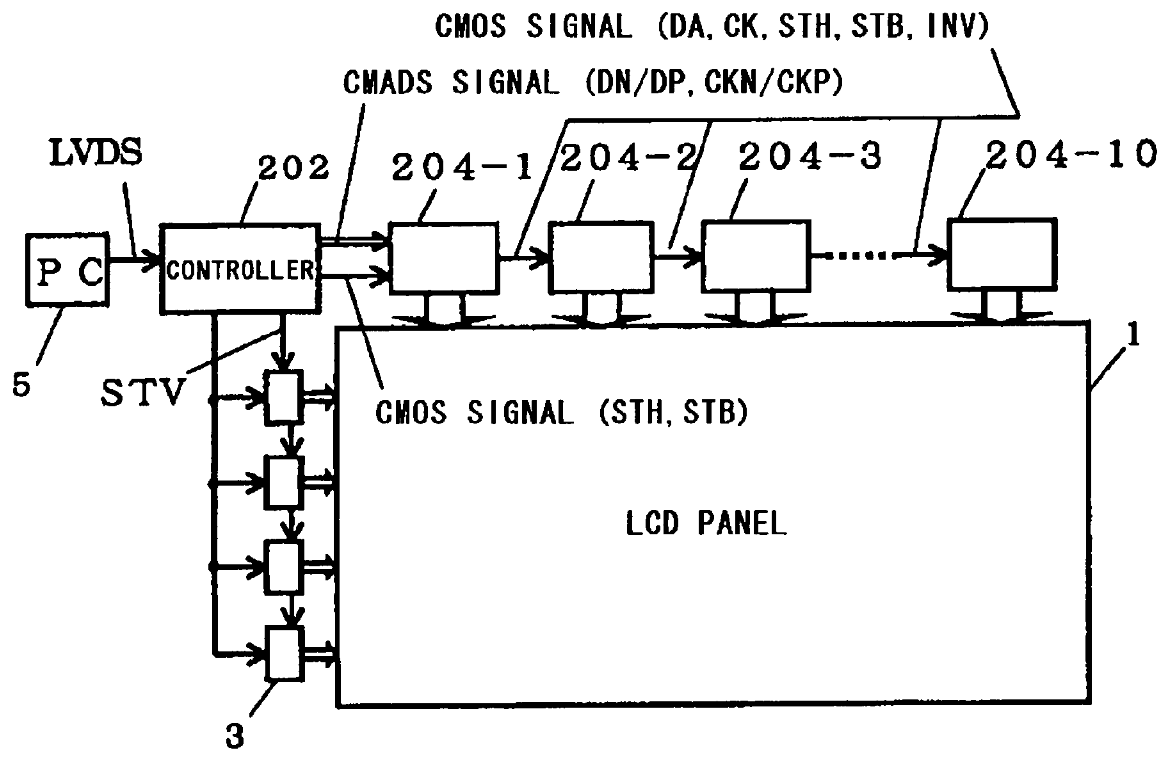
FIG. 12 is a block diagram showing a general configuration of a liquid crystal display module in a third embodiment of the present invention.

Next, a third embodiment of the present invention will be described with reference to FIG. 12. By assigning the same reference characters to the elements that are the same as those in FIG. 1, their descriptions will be omitted. A difference from the liquid crystal device in FIG. 1 is that a controller 202 and data drivers 204 are included in place of the controller 2 and the data drivers 4, and that the display data DN/DP and the clock signal CKN/CKP constituted by CMADS signals are transferred to a data driver 204-1 in the first stage from the controller 202 using a CMADS (Current Mode Advanced Differential Signaling: a trade mark of NEC Corporation) interface in place of the RSDS interface, as the low voltage differential signaling interface. For the data drivers 204, the same circuit configuration as that of the data drivers 4 shown in FIG. 2, except for use of CMADS receivers in place of the RSDS receivers 11*a* and 11*b* of the receivers 10, can be used. Their operations are also the same, so that illustration and description of them will be omitted.

In the first to third embodiments described above, the description was given, using examples where the data driver can perform switching between input of the CMOS signal and input of a low voltage differential signal which is one of the RSDS signal, mini-LVDS signal, and a CMADS signal, as display data input. The data driver is not limited to these. The data driver that can input only one of the RSDS signal, mini-LVDS signal, and CMADS signal, or the data driver that can input only the CMOS signal may be used. In the case of the data driver that can input only one of the RSDS signal, mini-LVDS signal, and CMADS signal, a circuit configuration may be employed in which as in the equivalent circuit when the IFM terminal of the receiver 10 shown in FIG. 6 is at the "H" level, the data inversion signal generation circuit and the primary data inversion circuit are included. In the case of the data driver that can input only the CMOS signal, a circuit configuration may be employed in which as in the equivalent circuit when the IFM terminal of the receiver 10 shown in FIG. 7 is at the "L" level, generation of the data inversion signal INV and the primary data inversion control are performed outside the data driver, and the input terminal of the data inversion signal INV for the secondary data inversion control is included. In this case, the generation of the data inversion signal INV and the primary data inversion control should be performed by the controller. In the liquid crystal display device which uses the data driver that can input only one of the RSDS signal, mini-LVDS signal, and CMADS signal or the data driver that can input only the CMOS signal, not only the above-mentioned chip-to-chip transfer method, but also a method of transferring display data from the controller in parallel with the respective data drivers can be employed. Further, other low voltage differential signal can be applied in place of the RSDS signal, mini-LVDS signal and CMADS signal. Though a description was given using the liquid crystal display device as an example, the invention is not limited to this, and can also be used for other display device in which display data are transferred through the internal wiring and captured by the data registers. Further, the invention is not limited to the display device, and can also be used for other electronic device in which data are transferred through the internal wiring and captured by the data registers.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An electronic device comprising:

a first semiconductor integrated circuit; and a plurality of cascade-connected second semiconductor integrated circuits comprising an initial-stage second semiconductor integrated circuit for receiving differential signals comprising data from the first semiconductor integrated circuit and sequentially transferring CMOS signals comprising the data, between each of the second semiconductor integrated circuits, wherein each second semiconductor integrated circuit comprises:

a receiver that receives either the differential signals or the CMOS signals in accordance with an interface mode select signal;

a data inversion signal generation circuit that detects a number of changed bits of the data comprised by the received signals and generates a data inversion signal corresponding with the number of changed bits of the inversion only when each second semiconductor integrated circuit is set to receive the differential signals;

a first data inversion circuit that subjects the CMOS signals to a first inversion in accordance with the data inversion signal; and a second data inversion circuit that subjects the CMOS signals thus subjected to the first inversion to a second inversion in accordance with the data inversion signal.

2. The electronic device according to claim 1, wherein in at least one of said second semiconductor integrated circuit devices, the data comprised by the CMOS signals and the data inversion signal are input from a second semiconductor integrated circuit device in a preceding stage connected to one of said second semiconductor integrated circuit devices.

3. The electronic device according to claim 1, wherein at least one of said second semiconductor integrated circuits comprises a receiving unit for receiving a signal comprising data, said data comprised by the CMOS signals from a second semiconductor integrated circuit in a preceding stage or data comprised by differential signals from said first semiconductor integrated circuit, when the CMOS signals are received, the data inversion signal is input to said at least one of said second semiconductor integrated circuits from said first semiconductor integrated circuit or from a said second semiconductor integrated circuit in said preceding stage connected to said at least one of said second semiconductor integrated circuits, and when the differential signals are received, the data inversion signal is generated at said receiving unit.

4. The electronic device according to claim 3, wherein:

said plurality of second semiconductor integrated circuits are connected in cascade so that the signals comprising data are sequentially transferred from said first semiconductor integrated circuit;

data comprised by the differential signals from said first semiconductor integrated circuit are transferred to a second semiconductor integrated circuit in a first stage;

and data comprised by the CMOS signals from the second semiconductor integrated circuit in said first stage are transferred sequentially to second semiconductor integrated circuits in subsequent stages.

5. The electronic device according to claim 4, wherein said receiving unit comprises:

differential signal receivers each for receiving the differential signals including at least two bits of the data as a pair when the differential signals are received and outputting said at least two bits of the data onto a same wiring as a time-multiplexed CMOS signal; and bypass circuits for bypassing the received CMOS signals from said differential signal receivers when the CMOS signals are received.

6. The electronic device according to claim 5, wherein said receiving unit comprises:

frequency divider circuits each for frequency dividing the CMOS signal from one of said differential signal receivers by at least two with respect to the differential signals, for output as parallel one-bit CMOS signals.

7. The electronic device according to claim 6, wherein said receiving unit further comprises:

a data inversion signal generation circuit for generating the data inversion signal; and a first data inversion circuit for performing first inversion of the data from said frequency divider circuits.

8. The electronic device according to claim 1, wherein the differential signal comprises one of a Reduced Swing Differential Signal (RSDS), a mini Low Voltage Differential Signaling (mini-LDVS) signal, and a Current Mode Advanced Differential Signaling (CMADS) signal.

9. The electronic device according to claim 1, wherein said electronic device is adapted for use as a display device, said first semiconductor integrated circuit comprises a control circuit, and said second semiconductor integrated circuits comprise data side driving circuits.

10. The electronic device according to claim 9, wherein said electronic device is adapted for use as a liquid crystal display device.

11. An electronic device comprising:

a first semiconductor integrated circuit device; and at least one second semiconductor integrated circuit device, said second semiconductor integrated circuit devices being connected to each other sequentially, if more than one said second semiconductor integrated circuit device, and said at least one second semiconductor integrated circuit device comprising a first of said sequentially connected second semiconductor integrated circuit devices, if more than one said second semiconductor integrated circuit device, differential signals comprising data from said first semiconductor integrated circuit device therein being transferred to a first one of said at least one second semiconductor integrated circuit device and CMOS signals comprising the data, being sequentially transferred between each of the second semiconductor integrated circuits, said electronic device adapted for a data transfer system comprising at least CMOS signals, wherein, when transferring data comprised by said differential signals from said first semiconductor integrated circuit device, a number of changed bits of said data before or after each received signal bit being detected, a data inversion signal is generated from said first one of said second semiconductor integrated circuit devices according to the number of changed bits, a first inversion of a data logic being performed at a transfer source according to the data inversion signal, each of said second semiconductor integrated circuit devices, if more than one said second semiconductor integrated circuit device, includes a data capturing circuit for capturing data, said data capturing circuit comprising a circuit for a second data inversion and is disposed immediately before inputs of data to data registers and performs said second inversion of data, and data in one of said second semiconductor integrated circuit devices comprises differential signals from said first semiconductor integrated circuit device when said one of said second semiconductor integrated circuit devices is set to receive the differential signals or from another one of said second semiconductor integrated circuit devices in a preceding stage connected to said one of said second semiconductor integrated circuit devices, if more than one said second semiconductor integrated circuit device and when said one of said second semiconductor integrated circuit devices is set to receive the CMOS signals, and said differential signals are converted to the data comprising the CMOS signals, and said each of said second semiconductor integrated circuit devices generates the data inversion signal only when said each of said second semiconductor integrated circuit devices is set to receive the differential signals.

12. An electronic device comprising:

a first semiconductor integrated circuit device transferring a signal comprising data; and a plurality of second semiconductor integrated circuit devices comprising an initial-stage second semiconductor integrated circuit for receiving differential signals comprising data from the first semiconductor integrated circuit and sequentially transferring CMOS signals comprising the data, between each of the second semiconductor integrated circuits, said second semiconductor integrated circuit devices each comprising:

a receiving unit generating a data inversion signal and inverted data of said received data according to said data inversion signal only when said each of said second semiconductor integrated circuit devices is set to receive the differential signals;

a data capturing circuit receiving said data inversion signal;

a data inversion circuit inverting logic levels of said inverted data according to said data inversion signal so as to output said received data; and a data register storing said received data, wherein said receiving unit of at least one of said second semiconductor integrated circuit devices each generates said data inversion signal based on a detection of a number of changed bits of said data between before and after receiving each bit of said data from said first semiconductor integrated circuit device.

13. The electronic device according to claim 12, wherein said receiving unit of said at least one of said second semiconductor integrated circuit devices generates said data inversion signal in response to said comparison when said receiver receives a differential signal as said data.

14. The electronic device according to claim 12, wherein said receiving unit of at least one of said second semiconductor integrated circuit devices receives said data inversion signal of said second semiconductor device in an immediately preceding stage when said receiver receives a CMOS signal as said data.

* * * * *